2,894,031
Patented July 7, 1959

2,894,031

PROCESS FOR CYCLOHEXANONE HYDRAZONE HYDRATE

Bernard Rudner, Pittsburgh, Pa., assignor to W. R. Grace & Co., New York, N.Y., a corporation of Connecticut No Drawing. Application September 16, 1958
Serial No. 761,285

3 Claims. (Cl. 260—566)

This invention relates to cyclohexylideneimino compounds and methods of preparing them. In one specific aspect, it relates to novel and improved methods of producing cyclohexanone hydrazone. This application is a continuation-in-part of my co-pending application Serial No. 615,504, filed October 12, 1956 which in turn is a continuation-in-part of application Serial No. 537,577, filed September 29, 1955.

Heretofore methods of producing the useful cyclohexylideneimino compounds in substantial quantities have been limited to the production of cyclohexanone oxime, cyclohexanone hydrazone, and cyclohexanone azine from the reaction of cyclohexanone and hydroxylamine or hydrazine respectively. In practice, it has been common to treat the ketone with solutions of hydrazine or hydroxylamine salts to accomplish this result. Compounds containing the cyclohexylideneimino structure are in commercial demand as important chemical intermediates in the field of plastics. More specifically, cyclohexanone oxime is commercially important in the production of caprolactam, the monomer for the nylon-6 polymer. Cyclohexanone hydrazone is useful as an insecticide, and its acyl derivatives have been patented as intermediates for polymerization initiators, soldering fluxes, and antitubercular drugs. The hydrazone, as I have previously indicated, has been heretofore prepared by treating the ketone with the relatively expensive reagent hydrazine as shown in Equation 1.

(1) 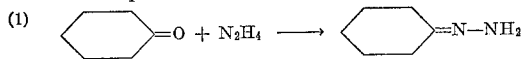

This interesting and useful product readily undergoes condensation to form cyclohexanone azine. The azine, on reaction with HCN, forms the known hydrazo-bis-(1-cyanocyclohexane), which has been used both as a polymerization initiator and as a blowing agent. See U.S. Patent No. 2,580,919 of E. G. Howard.

The prior art methods of producing cyclohexylideneimino compounds cannot be acquitted of disadvantage, since they involve the use of the expensive reagent hydrazine. This problem has been recognized by workers in the art. An attempt to prepare cyclohexanone oxime by the hydrolysis of chloramine in an aqueous sodium hydroxide solution in the presence of cyclohexanone resulted in poor yields of sodium cyclohexanone oximate. This result was to be expected since the hydrolysis of chloramine shown in Equation 2 below is a much slower reaction than the decomposition of chloramine Equation 3 in the presence of strong alkali.

(2) $ClNH_2 + H_2O \rightarrow H_2NOH + HCl$ (3) $3ClNH_2 + 3OH^- \rightarrow N_2 + NH_3 + 3H_2O + Cl^-$ I have now discovered conditions necessary for the occurrence of a new reaction, that of cyclohexanone with chloramine, to produce a new composition of matter cyclohexanechlorimine, corresponding to the formula:

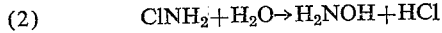

and equally unexpectedly, cyclohexanone hydrazone and cyclohexanone azine. In my reaction, the hydrazone is generally produced in the form of its hydrate. Since the formation of these compounds by my novel method are entirely unrelated to the chloramine hydrolysis, it is not dependent on the formation of hydroxylamine. It is likewise true that my reaction conditions are not those which yield appreciable quantities of hydrazine in a Raschig type synthesis. See Audrieth and Ogg, The Chemistry of Hydrazine, Wiley & Sons, Inc., New York, pages 34–35. Audrieth, in his book, points out that the formation of substantial quantities of hydrazine is predicated on (1) the presence of metal-suquestering agent such as glue or gelatin and (2) the use of low temperatures and/or superatmospheric pressures. The present invention offers a definite improvement by providing a simple and economical route to heretofore expensive but useful cyclohexylideneimino compounds and in adition discloses the existence of a useful intermediate, cyclohexanechlorimine.

Before enumerating in detail the range of reaction conditions applicable to the present invention, I find it appropriate to discuss the probable reaction mechanism by which my results are obtained. I do not maintain that the suggested mechanism is the only possibility because of the complex nature of the system; however, it is one to be most logically expected for reasons hereinafter stated.

(4) 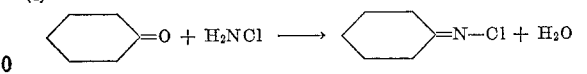

(5) 

(6) 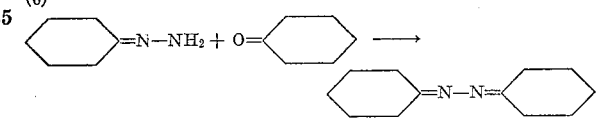

(7) 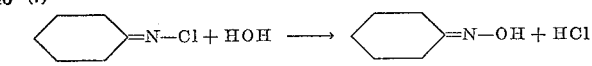

The reaction between cyclohexanone and chloramine Equation 4 is one of condensation. Cyclohexanechlorimine and water are the first products formed. The first mentioned compound, cyclohexanechlorimine, is unstable in the presence of water and may react with water to yield trace quantities of cyclohexanone oxime Equation 7. Generally, however, a more pronounced reaction, namely that of cyclohexanone chlorimine with ammonia (Equation 5), occurs resulting in the formation of cyclohexanone hydrazone or its hydrate. A further reaction between cyclohexanone hydrazone and cyclohexanone Equation 6 produces cyclohexanone azine. This latter compound can also be produced from the hydrazone alone Equation 8.

(8) 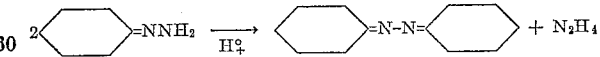

The aforesaid mechanism is entirely logical for several reasons. First, when the reaction conditions favor the formation of the azine or hydrazone the reaction may be stopped after all of the active chloramine has been used up to give as the sole identifiable product cyclohexanechlorimine. Analysis of the reaction mixture at this point shows no azine, hydrazone or free hydrazine. Second, under conditions favoring azine formation, the use of ammonia but no chloramine gives no cyclohexanoneimine,

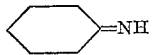

In other words, Equation 9 cannot occur because one of the reactants, cyclohexanoneimine, is lacking.

(9)

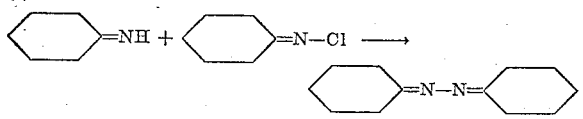

Third, even under low temperatures most favorable to the Raschig preparation of hydrazine, no hydrazine is obtained in the reaction mixture. This precludes the formation of cyclohexanone hydrazone by Equation 10.

(10) $ClNH_2 + NH_3 \rightarrow N_2H_4$

Broadly speaking, the present invention involves mixing chloramine, ammonia, and cyclohexanone. The reaction is allowed to procede to the point desired and the desired reaction product or products are separated therefrom and worked up by common laboratory techniques. Depending upon the manner in which the reaction is controlled, it is possible to prepare cyclohexanechlorimine to the exclusion of the azine or hydrazone hydrate. By further controlling the reaction conditions by methods hereinafter described, the azine or hydrazone hydrate can be made to predominate as the product obtained. Desired control can be effected by the use of such reaction additives as specific solvents, drying agents, and pH adjusters. The following detailed explanation will serve to illustrate the effect of the presence of these additives, the temperature and duration of the reaction, the reactant ratios, the source of chloramine, and the necessary work-up procedures.

SOURCE OF CHLORAMINE

In the preferred embodiment of my invention chloramine is conveniently synthesized by the ammonia-chlorine reaction in the gas phase. This reaction is fully described by Sisler and co-workers in JACS, 76, 3096 (1954). See also U.S. 2,710,248. A generator may be constructed in accordance with the teachings of Sisler et al. to provide a continuous stream consisting essentially of chloramine, ammonia and nitrogen. As an alternative to this procedure, chloramine can be made by reacting chlorine with an excess of ammonia in carbon tetrachloride solution or similar halogenated hydrocarbon solvent under controlled conditions of mixing at low temperatures. Such a procedure is fully described in U.S. Patent No. 2,678,258 to John F. Haller. Another effective procedure is fully described in Inorganic Syntheses, vol. I, 59 (1939).

By variation of the aforedescribed techniques of Sisler et al., Haller and Inorganic Syntheses, relatively ammonia-free solutions of chloramine can be prepared in a medium of an unreactive organic solvent. The term "unreactive" is applied to those solvents that do not react preferentially with chloramine, ammonia, or cyclohexanone. Relatively salt-free aqueous solutions of chloramine can be prepared by bubbling the product of the Sisler generator into cold water. Strongly alkaline chloramine solutions such as those employed by Raschig and Audrieth are effective for the purposes of the present invention if the use of a sequestering agent to encourage the formation of hydrazine is omitted.

REACTANT RATIOS

In all of the methods described for obtaining chloramine as the reactant ratio of ammonia to chloramine is at least about 5:1. About 5 moles of ammonia per mole of chloramine is required to stabilize the chloramine once it is formed. If less than that quantity of ammonia is used, the unstable and explosive nitrogen trichloride may be formed which would materially interfere with the production of cyclohexylideneimino compounds. The maximum amount of ammonia present in the reaction is limited by practical rather than theoretical consideration. It is possible, of course, to use an ammonia to chloramine ratio such as 250:1 and higher although beyond this point it is doubtful if any beneficial results are obtained by the presence of additional quantities of ammonia. For experimental control of the ammonia to chloramine ratio the relative quantity of these reactants may be ascertained from the method of chloramine preparation. The quantity of chloramine present in a sample may be readily analyzed by the potassium iodide-HCl-starch-thiosulfate technique.

The relative proportions of chloramine and cyclohexanone are subject to even less scrutiny. Since an excess of cyclohexanone may be used as a solvent, there is no true upper limit. The lower limit for desirable yields is predicated on the chemistry of the reaction. Since the reaction mechanism shows that 2 mols of cyclohexanone per mol of chloramine are required for the formation of the azine the lower theoretical limit for the complete conversion to cyclohexanone azine would be 2:1. It is obvious, of course, that only 1 is required for the formation of cyclohexanechlorimine and that proportionately less cyclohexylideneimino compounds would be formed if this mol ratio were reduced.

TEMPERATURE OF REACTION

Practical rather than theoretical limits also govern the temperature conditions to be selected for the reaction. Generally speaking, temperatures below the boiling point of ammonia ($-33°$ C.) which favor the formation of hydrazine as well as ammonia catalyzed cyclohexanone auto condensations should be avoided. Above room temperature decomposition of chloramine in the presence of ammonia to nitrogen and ammonium chloride becomes measurable. Since this decomposition reaction occurs at speeds proportional to the temperatures I prefer not to work above temperatures of 100° C. For convenience the temperature range between that attainable by aqueous cooling bath, e.g., $-15°$ C., and ambient temperatures up to about 50° C. are preferable.

REACTION ADDITIVES

I have found that I may vary my reaction conditions by the use of a solvent, a drying agent, pH adjuster, or a combination of these. The presence of any or all of these reactants is not necessary in a particular reaction. By judicial selection of an additive, however, I am better able to control the nature of the product that I obtained from my novel reaction.

The function of the solvent is one of economy and simplicity. For instance, it is convenient to bubble a chloramine-ammonia gas stream up through a head of the ketone, but for beter adsorption and therefore reaction, a long column of the expensive pure ketone would be required unless a cheap, inert, readily removable diluent is used. Solvents which serve this purpose include hydrocarbons, e.g., heptane, cyclohexane, benzene, xylene and the like; ethers, e.g. diethylether, diamylether, and anisole; amides, e.g. dimethylformamide, and dimethylacetamide; halohydrocarbons, e.g. chloroform, carbon tetrachloride, trichloroethylene, and chlorobenzene; and nitroaromatics, e.g. $C_6H_5NO_2$. For special purposes, water and other hydrolytic solvents such as ethanol and cellosolve may be used. It is obvious, of course, that the ketone can be used as its own solvent. The solvents which I have mentioned are extremely suitable because of their relatively low cost and availability. Obviously, my limited list was not intended to be all inclusive. Equivalent unreactive or inert solvents need not be further enumerated since they are obvious to skilled laboratory technicians.

I have already indicated that cyclohexanechlorimine reacts with water to form trace quantities of the oxime. It is a well known principle of organic chemistry that dehydration reactions can be pushed forward by conducting them under anhydrous conditions; viz., removing any water produced by the reaction as fast as it is formed. Therefore, the highest yields of cyclohexanechlorimine, cyclohexanone azine, and the hydrazone hydrate, can be best obtained by the use of azeotropic distillation or a drying agent. Suitable drying agents include those enumerated hereunder in Table I.

*Table I*

| MgSO₄ | MgO |
|-------|-----|
| Na₂SO₄ | Ba(ClO₄)₂ |
| CaSO₄ | NaOH |
| CaO | KOH |

Common chemical equivalents of those drying agents listed in the table are apparent to those skilled in the art. Drying agents having the nature of sulphuric acid and $P_2O_5$ would be obviously unsuitable since they would interfere by preferential reaction.

DURATION OF REACTION

The duration of the reaction is predicated on the nature of the product desired, which in turn determines the work-up procedure. A quick glance at the reaction mechanism (Equations 4–7), suggests that if cyclohexanechlorimine is desired as the major product that the reaction mixture should be allowed to stand only until the chloramine has been used up. This point can be determined as the time when (1) a saturated aqueous solution of benzaldehyde fails to precipitate an oil

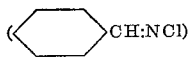

on being shaken with a drop of the reaction mixture, (2) when a drop of the reaction mixture added to chilled dimethylaniline in ether fails to yield a precipitate of phenyldimethylhydrazinium chloride or (3) when the ultra-violet absorption maximum at 2500 A., characteristic of chloramine, is converted to a broader maximum extending below 2350 A. A cold anhydrous media in the presence of a drying agent favors the formation of a maximum yield of cyclohexanechlorimine. Example I details the isolation of this product from such a system.

On the other hand, if a maximum yield of azine or hydrazone hydrate is desired, it is necessary not only to react all of the chloramine but the cyclohexanechlorimine formed luring the reaction as well, i.e., the reaction is not complete until the mixture has lost its power to oxidize KI in acid to $I_2$. Example XI furnishes somewhat of an exception to this rule. In that example, the ammonium chloride precipitated out of the reaction adsorbed almost all of the cyclohexanechlorimine before it could be destroyed, and good yields of the cyclohexanechlorimine, the cyclohexanone hydrazone hydrate, and cyclohexanone azine were obtained. Even in such a situation allowing the reaction to proceed until all of the cyclohexanechlorimine has been consumed gave an even better yield of the azine at the expense of the other two compounds. However, by this latter technique an appreciable quantity of a non-hydrolyzable dark oil of undetermined composition is formed. Such an oil is believed to be a fused ring compound of unknown structure.

NATURE OF PRODUCTS

Cyclohexanechlorimine consists of pearly plates melting at about 20° C. and decomposing at approximately 90° C. As I have previously indicated, it can be obtained from cold anhydrous solutions in the presence of a drying agent in yields of about 68.5%.

Cyclohexanone hydrazone hydrate has been obtained in yields as high as 70% by allowing chloramine-ammonia-cyclohexanone reaction to proceed in anhydrous medium until all of the cyclohexane chlorimine has been destroyed. The cyclohexanone hydrazone hydrate thus formed is a white solid, melting at 102–103° C. with sublimation, soluble in the common solvents such as water and hydrolyzable to equivalent quantities of cyclohexanone and hydrazine.

Cyclohexanone azine is a tan oil which forms wet crystals at about 27–29° C., remelting at about 30° C. Maximum yields of this compound are obtained using an excess of cyclohexanone as a solvent for the reaction mixture.

The present invention is further described by the following illustrative but non-limiting examples.

EXAMPLE I.—CYCLOHEXANECHLORIMINE

A generator was constructed to produce a chloramine-ammonia mixture diluted with nitrogen using the aforementioned process of Sisler et al. Such a stream of mixed gases (containing approximately a 1:8:10 mol ratio of chloramine:ammonia:nitrogen), was passed through a chilled solution of 5 g. cyclohexanone in 100 ml. of dry diethyl ether containing about 2 g. of anhydrous MgSO₄ for about 20 minutes. The resultant reaction mixture contained about 2.1 mols of chloramine per mol of cyclohexanone. The reaction of the chloramine with the cyclohexanone in the mixture was then followed spectrophotometrically. Twenty-four hours after the addition of chloramine to the reaction mixture the maximum absorption at 2500 A., characteristic of chloramine, had disappeared, indicating that the chloramine was no longer present. A broader maximum absorption band below 2350 A., resembling somewhat that of cyclohexanone oxime was observed, which predicted the presence of a compound of similar chemical structure. The weak absorption characteristic of cyclohexanone at 2850 A. was no longer apparent (thus indicating that the cyclohexanone has been consumed by the reaction). At this stage, tests for chloramine were negative (e.g. precipitation of benzalchloramine on adding an aqueous extract to a saturated aqueous solution of benzaldehyde), but the ether solution contained active chlorine equivalent to a 68.5% yield of cyclohexanechlorimine.

EXAMPLE II.—REDUCTION OF CYCLOHEXANECHLORIMINE

A sample of the reaction mixture of Example I was treated with alkaline sodium bisulfide solution. The cyclohexanechlorimine was reduced by this treatment to ammonia, sodium chloride, and cyclohexanone.

EXAMPLE III.—CYCLOHEXYLAMINE

A sample of the reaction mixture of Example I was reduced by treating it with zinc and acetic acid. A 63% yield of cyclohexylamine, identified as its benzoyl and benzenesulfonyl derivatives, melting at 146° and 88° C., respectively, was obtained.

EXAMPLE IV.—CYCLOHEXANONE HYDRAZONE HYDRATE

A portion of the reaction mixture of Example I was treated by alternate stirring and shaking with triethylamine (an anhydrous base stronger than ammonia). The cyclohexanechlorimine was converted in good yield to cyclohexanone hydrazone hydrate, melting at 102–103° C. by the addition of a rapid stream of ammonia.

EXAMPLE V.—CYCLOHEXANECHLORIMINE

A sample of the reaction mixture of Example I was allowed to sit for 48 hours. It was then filtered, and evaporated at 0° C. The product, cyclohexanechlorimine, consists of pearly plates that melted at about 20° C. and decomposed at approximately 90° C. with the formation of a gas, ammonium chloride and cyclohexanone. The cyclohexanechlorimine was found to be highly unstable once isolated and for this reason it was usually kept in solution.

EXAMPLE VI.—CYCLOHEXANECHLORIMINE

The procedure of Example I was repeated in every detail with the exception that the anhydrous magnesium sulfate was omitted from the reaction mixture. A 46% yield of cyclohexanechlorimine (by active chlorine determination) was obtained. The reduction in yield was due primarily to the lack of reaction; i.e., about half of the cyclohexanone failed to react. This was indicated by the fact that 42% more ammonium chloride was obtained than expected where 1 mol of chloramine was reacted with 1 mol of cyclohexanone.

EXAMPLE VII.—CYCLOHEXANECHLORIMINE

A 10 ml. quantity of cyclohexanone was added over a period of 30 minutes at 0–3° C. to a solution of chloramine (from 20.4 g. $NH_3$ in 200 ml. $CCl_4$ and 6 g. $Cl_2$ in 150 ml. $CCl_4$). The mixture was allowed to come to room temperature over night. After clarification and evaporation it gave a low yield of cyclohexanechlorimine.

EXAMPLE VIII.—CYCLOHEXANONE HYDRAZONE HYDRATE

A chloramine-ammonia mixture was passed into 30 g. of cyclohexanone dissolved in 100 ml. trichloroethylene. The treated solution contained about 2 equivalents of $ClNH_2$ per equivalent of cyclohexanone. The mixture was allowed to stand for 48 hours, and was subsequently filtered free of ammonium chloride. The filtrate yielded less than 1% cyclohexanechlorimine (as determined by titration of active chlorine) 2% cyclohexanone azine, and 70% cyclohexanone hydrazone hydrate. There were also detectable quantities of cyclohexanone oxime present. The mixture was resolved by extracting the filtrate with 50 ml. of 5% NaOH solution, which dissolved the oxime. By evaporating the trichloroethylene dry, and extracting the residue with cold n-hexane, crude cyclohexanone hydrazone hydrate was left. Recrystallization of this hydrazone hydrate gave a white compound melting at 103–104° C. Although it resisted dehydration by sublimation or storage over $P_2O_5$, an analytical sample, vacuum dried at 65° C., gave correct values for cyclohexanone hydrazone (calculated: C=64.2%, H=10.7%; found: C=64.3%, H=10.2%). Dehydration by azeotropic distillation with toluene showed the product to be a monohydrate.

EXAMPLE IX.—CYCLOHEXANONE AZINE

Cyclohexanone azine was obtained from the hexane extract of Example VIII by charcoaling a cold acid solution of this evaporated extract and reprecipitating with sodium bicarbonate. The product was a tan oil which froze to a tangled mass of wet crystals at 27–29° C., and remelted at 30–33° C. Its structure was confirmed by a boiling HCl hydrolysis to a 2 mol cyclohexanone to 1 mol of hydrazine mixture. Each component was identified as in the case of the hydrazone hydrate of Example VIII.

EXAMPLE X.—CYCLOHEXANONE HYDRAZONE HYDRATE

A solution of chloramine in dimethylformamide (made in 20% yield by bubbling chloramine and ammonia through cold solvent, then filtering free of $NH_4Cl$), was treated with an equivalent quantity of cyclohexanone and allowed to evaporate spontaneously for two weeks. This reaction mixture yielded 2% cyclohexanone azine, 29% cyclohexanone hydrazone hydrate, and 46% $NH_4Cl$. Trace quantities of cyclohexanone oxime were present.

EXAMPLE XI.—CYCLOHEXANECHLORIMINE, CYCLOHEXANONE HYDRAZONE HYDRATE AND CYCLOHEXANONE AZINE

A chloramine-ammonia stream containing 0.2 mol chloramine, was passed into a large excess of pure cyclohexanone kept at 20° C. It was held at room temperature until all of the chloramine was consumed (as shown by the failure of an aqueous extract to give a precipitate with a saturated aqueous solution of benzaldehyde). This reaction mixture yielded 30% cyclohexanechlorimine, 30% cyclohexanone hydrazone hydrate, and 20% cyclohexanone azine. It is believed that the yield of cyclohexanechlorimine thus obtained was abnormally high in the presence of the hydrazone which it attacks readily. It was felt that this high yield was obtained because approximately 90% of the chlorimine was associated with, or adsorbed onto, the precipitated ammonium chloride in the reaction mixture.

EXAMPLE XII.—CYCLOHEXANECHLORIMINE, CYCLOHEXANONE HYDRAZONE HYDRATE AND CYCLOHEXANONE AZINE

A chloramine-ammonia mixture was passed into an aqueous suspension of cyclohexanone for 21 minutes. The mixture was allowed to stand for a week, and it yielded as a precipitate approximately 20% of the theoretical yield of solid cyclohexanone hydrazone hydrate described in the previous examples, which melted at 102–103° C. The filtrate contained 7% cyclohexanechlorimine (by titration), and additional 10% of the hydrazone. Trace quantities of cyclohexanone oxime were also present.

EXAMPLE XIII.—CYCLOHEXANONE AZINE

A 5% emulsion of cyclohexanone in saturated sodium bicarbonate solution was treated with an equivalent amount of a 1% aqueous chloramine solution. The reaction was allowed to stand until all of the oxidizing power of the chloramine was gone. Cyclohexanone azine was obtained in a 12% yield. Since it was the only identifiable product in the reaction mixture, it is apparent that conditions of reduced alkalinity further the reaction of the hydrazone with additional cyclohexanone to produce the cyclohexanone azine. The limited amounts of ammonia present in this particular reaction mixture also militate against the formation of the cyclohexanone hydrazone as an end product. This particular modification of the general reaction is especially desirable, since it provides a relatively uncontaminated cyclohexanone azine that can be used as an intermediate in known and useful processes hereinbefore described.

EXAMPLE XIV.—CYCLOHEXANONE HYDRAZONE HYDRATE

The procedure of Example XIII was substantially repeated with the omission of the sodium bicarbonate. A stable emulsion of 5% cyclohexanone and water was treated with an equivalent of 2% aqueous chloramine (prepared according to Inorganic Syntheses, vol. I, p. 59 (1939) but without ether extraction), and allowed to react until all of the oxidizing power of the chloramine had disappeared. Using a work-up procedure similar to that described in the previous examples, a 1% yield of cyclohexanone azine, a 3% yield of cyclohexanone oxime, an 8% yield of cyclohexanone hydrazone hydrate, and 63% unconsumed or regenerated cyclohexanone were obtained.

EXAMPLE XV.—CYCLOHEXANONE AZINE

A chloramine-ammonia gas stream such as that described in the previous examples was passed into an emulsion of cyclohexanone in a saturated aqueous NaOH solution at room temperature. The oxidizing power of the reaction mixture disappeared in one day and the products were identified as 3% cyclohexanone oxime, and 12% cyclohexanone azine.

EXAMPLE XVI.—CYCLOHEXANONE HYDRAZONE HYDRATE

A chloramine-ammonia gas stream was passed into an aqueous emulsion of cyclohexanone containing 30% by weight of NaOH. The oxidizing power of this solution disappeared after about 2 hours and the products thus obtained were 2% cyclohexanone oxime, and 59.5% cyclohexanone hydrazone hydrate.

EXAMPLE XVII.—CYCLOHEXANONE AZINE

The dropwise addition of cyclohexanone hydrazone hydrate to a boiling 5–10% aqueous solution of $Al(NO_3)_3$ gave approximately an 80% conversion to the less soluble azine.

I claim:

1. A method of preparing cyclohexanone hydrazone hydrate which comprises contacting an aqueous solution of chloramine containing at least 5 mols of ammonia per mol of chloramine therein with an aqueous suspension of cyclohexanone to initially form cyclohexanechlorimine, the number of mols of said chloramine present exceeding the number of mols of said cyclohexanone added, maintaining in the reaction mixture a temperature between the freezing point and the boiling point of said mixture, continuing the reaction until all of said reactive cyclohexanechlorimine has been consumed and recovering said hydrazone hydrate therefrom.

2. A method of preparing cyclohexanone hydrazone hydrate which comprises contacting a chloramine-ammonia gas stream containing at least 5 mols of ammonia per mol of chloramine therein with cyclohexanone in the presence of an unreactive organic solvent to initially form cyclohexanechlorimine, the number of mols of said chloramine added to exceed the number of mols of said cyclohexanone present, maintaining in the reaction mixture a temperature between about −33 and 100° C., continuing the reaction until all of said reactive cyclohexanechlorimine had been consumed and recovering said hydrazone hydrate therefrom.

3. A method according to claim 2 wherein the chloramine-ammonia gas stream is diluted with nitrogen.

No references cited.